Feb. 11, 1964 A. FINLAY ET AL 3,120,861
METHOD AND APPARATUS FOR IDENTIFYING AND EVALUATING
SURFACE CHARACTERISTICS OF FOREST PRODUCTS
Filed July 14, 1960 5 Sheets-Sheet 1

Alexander Finlay
Fred E. Berger
INVENTORS

BY Eugene P. Farley

Atty.

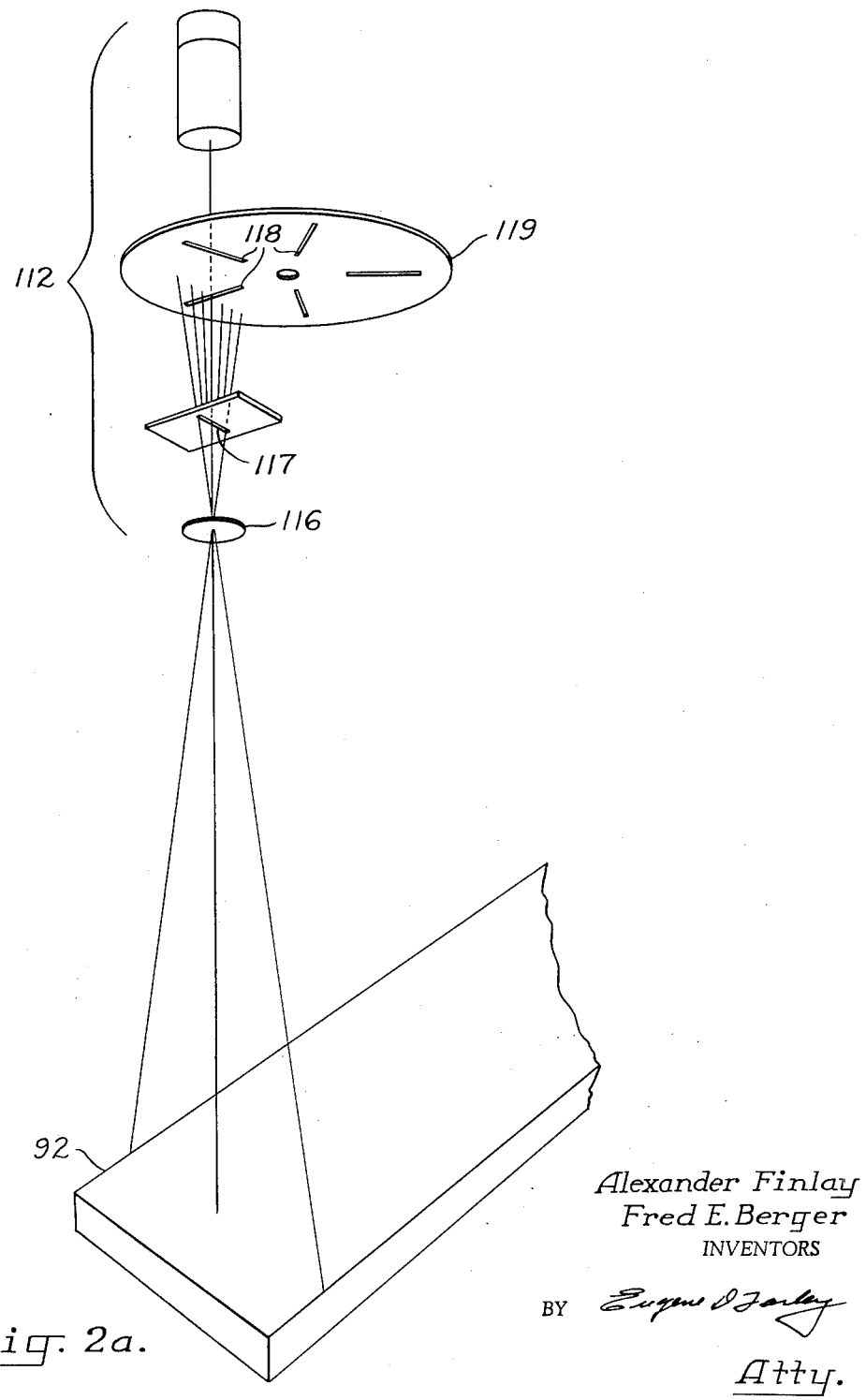

Feb. 11, 1964  A. FINLAY ET AL  3,120,861
METHOD AND APPARATUS FOR IDENTIFYING AND EVALUATING
SURFACE CHARACTERISTICS OF FOREST PRODUCTS
Filed July 14, 1960  5 Sheets-Sheet 3

Alexander Finlay
Fred E. Berger
INVENTORS

BY *Eugene R. Farley*

*Atty.*

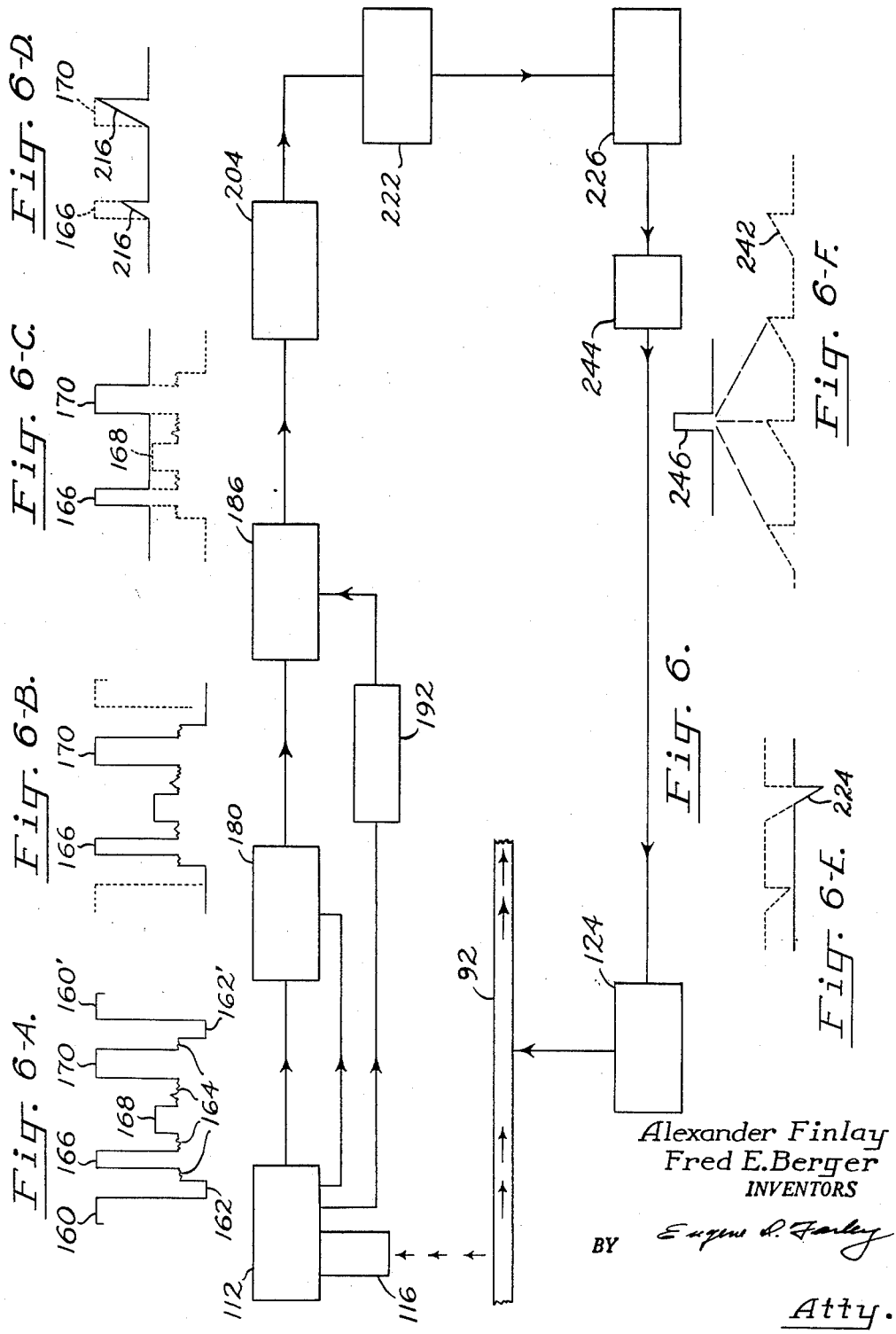

Alexander Finlay
Fred E. Berger
INVENTORS

United States Patent Office 3,120,861
Patented Feb. 11, 1964

3,120,861
METHOD AND APPARATUS FOR IDENTIFYING AND EVALUATING SURFACE CHARACTERISTICS OF FOREST PRODUCTS
Alexander Finlay, Columbus, and Fred E. Berger, Hilliards, Ohio, assignors, by mesne assignments, to Western Pine Association, Portland, Oreg., a non-profit corporation of Oregon
Filed July 14, 1960, Ser. No. 42,930
11 Claims. (Cl. 144—2)

This invention pertains to the detection of surface characteristics of forest products, and relates particularly to a method and apparatus for identifying and evaluating surface characteristics in forest products continuously as they are being processed in manufacture.

Among the many forest products requiring evaluation of surface characteristics for grading, sorting and/or subsequent processing, are logs, timbers, boards, veneers, plywoods, composition boards such as hardboards, particle boards and bark boards, paper and others. Types of surface characteristics required to be identified for evaluation include sizes and shapes of knots, knot holes, pitch pockets, stains, decay areas, worm holes, splits, torn grain, machine burn, paper inclusions, end and edge glue lines, and many others.

It is a principal object of the present invention to provide a method and apparatus by which to identify and evaluate the foregoing and other surface characteristics of forest products automatically during continuous movement of the latter during processing.

Another important object of this invention is the provision of a method and apparatus by which to identify and evaluate surface characteristics in forest products in such manner as to afford subsequent processings, including the following: the products may be sorted or graded by knot size; bright areas of woods may be sorted from stained areas of woods; veneers may be sorted for appropriate use in laminations; boards and other products may be sorted for random length cutup for clear or special grades in flooring manufacture, paneling production, end and edge gluing, finger jointing and others, or for specified length cutup for clear or special grades in sash and door plants, furniture plants, packaged trim production, cut stock departments and others; various types of wood products may be rejected or accepted for further sorting or grading according to surface characteristics; composition boards may be sorted or graded according to flaws and variations of color; logs may be inspected after barking and sorted or graded according to surface characteristics; various wood products may be inspected for knot holes and automatically plugged, or inspected for knots and other defects and automatically patched; and various forest products may be inspected and the information as to surface characteristics fed to computers for evaluation and determination of the proper further processing for greatest economic realization.

Another important object of the present invention is the provision of a method and apparatus by which to discriminate between objectionable and non-objectionable surface characteristics in forest products.

Still another important object of this invention is to provide a method and apparatus by which the discrimination between objectionable and nonobjectionable surface characteristics in forest products may be varied over a substantial range to accommodate a wide range of grading.

A further important object of the present invention is the provision of a method and apparatus by which to detect objectionable surface characteristics in forest products and to mark the location and extent of such defects automatically upon the forest product for subsequent removal.

A still further important object of this invention is the provision of a method and apparatus by which to prevent false marking of forest products at the abutting ends of the latter as they progress continuously through the detecting apparatus.

A further important object of the present invention is to provide a method and apparatus by which the detection of various types of surface characteristics in forest products functions automatically to initiate desired subsequent operations upon the forest products.

A further important object of the present invention is to provide a method and apparatus by which to cut out objectionable surface characteristics in forest products automatically as they are detected.

Still another important object of this invention is to provide a method and apparatus by which to detect and evaluate surface characteristics in forest products continuously at the high rate of speed of normal production.

A further important object of this invention is the provision of apparatus for detecting and evaluating surface characteristics in forest products, which apparatus is of simplified construction for economical manufacture, requires a minimum of technical skill for its operation and maintenance, and is of rugged design for long and faithful service with a minimum of maintenance and repair.

The foregoing and other objects and advantages of this invention will appear from the following detailed description, taken in connection with the accompanying drawings in which:

FIG. 2a is a schematic perspective view of a photoelectric device employed in the apparatus;

FIG. 6 is a schematic diagram in block form of the electric circuit for the defect detecting and discriminating component of the apparatus, electrical waveforms being associated with the various sections of the component for purposes of explanation and being identified as FIGS. 6-A to 6-F inclusive;

In its broad concept, the method and apparatus of this invention involves scanning the image of the surface of a forest product and the detection of variations in light intensity over the image to produce electrical signals which are descriptive of the geometry of defects and are proportional in amplitude to the degree of variation in light intensity. The electrical signals thus produced are utilized to actuate a marking device, a cut-out device, or other appropriate processing device. Means may be provided for varying the amplitude of signal required for actuating the processing device, to afford selective discrimination between types and degrees of defects, and hence selective control of further processing.

Figure 1:
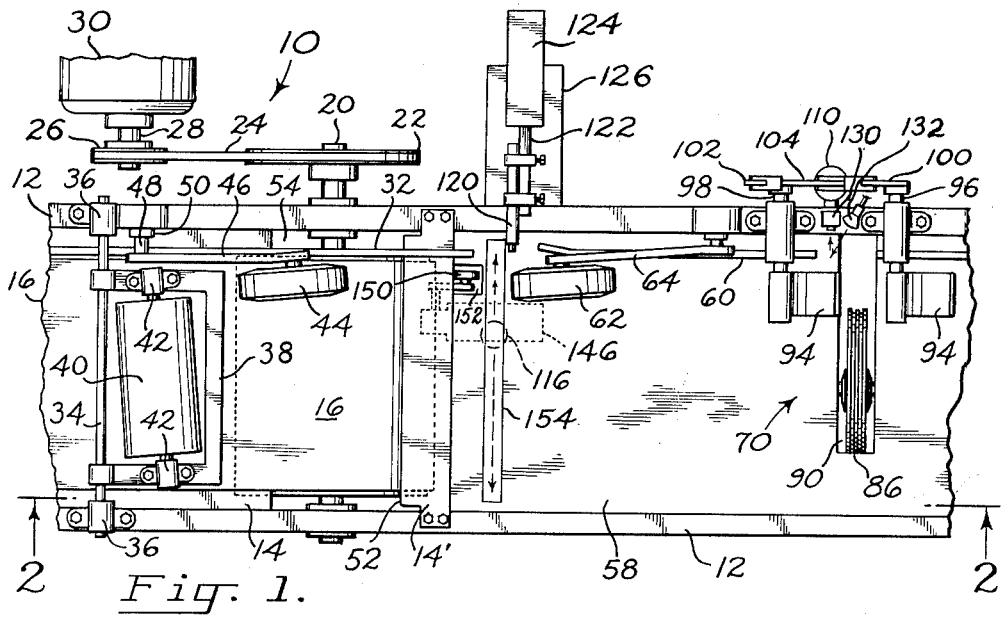
FIG. 1 is a fragmentary plan view of forest product defect detecting, marking and removing apparatus embodying the features of the present invention.
Figure 2:
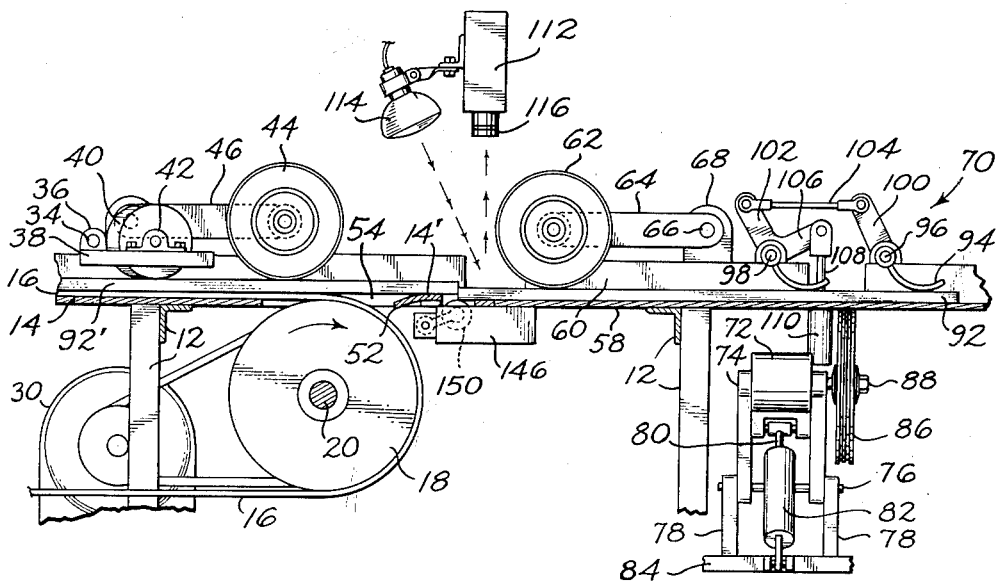
FIG. 2 is a fragmentary sectional view in side elevation taken along the line 2—2 in FIG. 1.

Referring particularly to FIGS. 1 and 2 of the drawings, the apparatus illustrated therein includes a forest product infeed conveyor section 10 which comprises a framework 12 of vertical and horizontal members supporting an infeed table 14. The table supports the operating stretch of a continuous conveyor belt 16 carried by a rear idler roll (not shown) and a forwardly spaced drive roll 18. The rolls are mounted for rotation on the framework and the forward drive roll shaft 20 carries a belt pulley 22 which is connected through the belt 24 to the pulley 26 mounted on the driven shaft 28 of the drive motor 30.

The framework also supports a longitudinally extending guide rail 32 adjacent one lateral side thereof for guiding one edge of the product through the apparatus.

A pivot shaft 34 extends transversely across the conveyor belt and is supported above the latter by the end bearings 36 mounted upon the lateral members of the framework. The spaced ends of a U-shaped bracket 38 are secured to the pivot shaft, and a hold-down guide roll 40 is supported by the bracket for rotation on the end bearings 42. These bearings are mounted upon the spaced arms of the bracket 38 in such manner as to orient the roll on an axis which forms with the forward extending guide rail 32 an included angle of less than 90°. The guide roll swings freely by gravity toward the infeed conveyor belt 16 and functions to hold the forest product firmly upon the conveyor belt. The oblique arrangement of the roll also functions to urge the product continuously toward the guide rail during its progress through the apparatus.

The guide roll 40 terminates a spaced distance from the guide rail 32, and hence there is provided a second guide roll 44 positioned immediately adjacent the guide rail and supported for rotation upon the forward end of the arm 46 the rearward end of which is secured to the stub shaft 48 journaled for rotation in the bearing 50 mounted on the framework. The second guide roll also is arranged with its axis substantially parallel to the first guide roll, and serves to hold down narrow pieces of forest product and to urge the latter against the guide rail.

The forward end of the infeed conveyor table 14 is defined by a transverse plate 14' supported at its ends on the laterally spaced frame members of the framework, the trailing end 52 of the plate being curved downwardly to provide an incline for receiving the forward end of a piece of forest product as the latter progresses through the apparatus. A transverse opening 54 is provided between the forward edge of the table section 14 and the rearward edge of the plate 14', for passage of the conveyor belt 16.

The apparatus also includes an outfeed table 58 supported upon the framework 12. As best shown in FIG. 2, the upper surface of the outfeed table is disposed slightly below the upper surface of the infeed table. The purpose of this arrangement is explained in detail hereinafter.

The outfeed table also includes a longitudinally extending guide rail 60 disposed in alignment with the infeed guide rail 32. An outfeed hold down roll 62 is positioned adjacent the rearward end of the outfeed table and adjacent the outfeed guide rail 60, and is mounted for rotation on the rearward end of the arm 64. The forward end of this arm is secured to the stub shaft 66 mounted for rotation in the bearing 68 supported by the outfeed table framework. The axis of rotation of the outfeed guide roll is disposed substantially parallel to the axes of the infeed rolls, for urging the forest product against the guide rail, as explained hereinbefore.

The outfeed table serves to support the forest product during detection of surface characteristics, and it may also support the product for subsequent processing, such as the patching of defects in veneers, the selective sorting of products according to surface characteristics, the marking of the products at the locations of objectionable surface characteristics, and others.

In the embodiment illustrated, the outfeed table is associated with a cut-out saw machine 70 for removing detected defects in the forest product. The saw motor 72 is mounted upon a U-shaped bracket 74 at the closed end thereof, the spaced arms of the bracket being mounted on the pivot shaft 76 which is supported at its ends on its spaced frame members 78. The piston rod 80 of an extensible air cylinder 82 is connected pivotally to the motor bracket 74 intermediate the ends of the latter, and the opposite end of the cylinder is supported pivotally on the frame member 84. Thus, by extension and retraction of the piston rod 80, the motor bracket 74 is pivoted arcuately and the dado or saw blades 86 mounted on the motor shaft 88 are caused to extend arcuately upward through a slot 90 in the outfeed table 58 to intercept the forest product 92 and to retract arcuately rearward and downward after the defect has been cut from the product.

During operation of the cut-out saw, described in detail hereinafter, it is necessary that the product be held stationary, and to this end there is provided a pair of clamping fingers 94 positioned longitudinally on opposite sides of the saw blade 86 and mounted upon spaced pivot shafts 96, 98 supported by the framework. Each shaft carries an arm 100, 102 respectively, and these arms are interconnected by the pivot link 104. A bell crank lever is formed by the arm 102 and an associated arm 106, the latter being connected pivotally to the piston rod 108 of an extensible air cylinder motor 110. The motor cylinder is mounted pivotally on the framework. Thus, by extension and retraction of the piston rod 108, the bell crank lever is caused to rotate counterclockwise and clockwise, respectively, to effect release and clamping of the clamping fingers 94. It will be understood that when the clamping fingers hold a piece of lumber against movement, the abutting piece of forest product 92' supported upon the infeed conveyor belt 16 also is held against movement, the conveyor belt being caused to slip. This does not present any substantial problem of wear since the time interval for operation of the cut-out saw is extremely short.

For purposes of detecting surface characteristics in forest products, there is mounted above the outfeed table 58 adjacent the rearward end thereof a photo-electric device 112. Although various forms of light, including daylight, may be used to illuminate the surface of the forest product, one or more incandescent flood lamps 114 have been found convenient for normal usage. Other means of light such as ultraviolet, infrared and others, together with light filters if desired, are useful in specialized applications to accentuate certain surface characteristics.

The flood lamp illuminates the surface of the product 92 and a lens 116 on the photo-electric device images the product surface on a fixed slit 117 (FIG. 2a) oriented perpendicular to the direction of movement of the product through the apparatus. Scanning of this image is accomplished by moving another slit 118 across the fixed slit approximately perpendicular thereto, as by positioning a disc 119 containing a plurality of slits 118 directly behind the fixed slit and rotating the disc. The slits in the disc are oriented so that one slit completely traverses and goes beyond the edge of the fixed slit before the next slit appears in the field. Thus, as the image is scanned, light is transmitted through the moving hole produced, by traverse of the moving slit over the fixed slit, and the intensity of the light transmitted at any instant is representative of the illumination of the segment being scanned. The light transmitted through the slits is focused upon the photocathode of a photo-multiplier tube, for example a type 6292 Dumont photo-mulitplier tube, and this tube produces an electrical signal the amplitude of which is dependent upon the intensity of light at any instant. Thus, optical information derived from the surface of the forest product is converted into corresponding electrical information.

Figure 3:
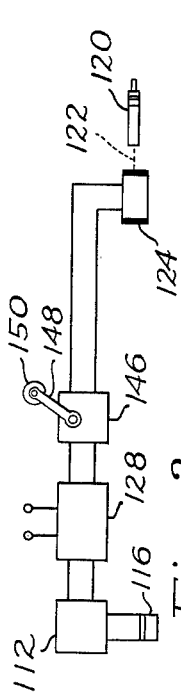
FIG. 3 is a schematic diagram in block form of an electric circuit for the defect detecting and marking components of the apparatus.
Figure 4:
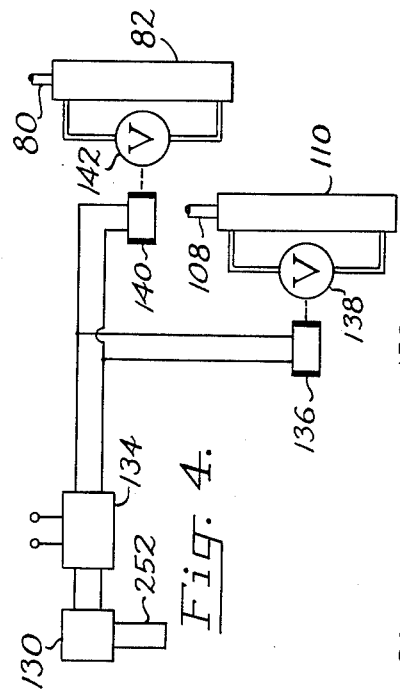
FIG. 4 is a schematic diagram in block form of an electric circuit for the mark detecting and cut-out saw control components of the apparatus.

The electrical signal from the photo-multiplier tube may be utilized to mark or remove the defect. In the embodiment illustrated in FIGS. 1–4, means is provided for marking the forest product with a visible indication of the location and length of defects predetermined to be objectionable defects. In this embodiment, such marking means comprises a marking pen 120 positioned for retractable engagement with the edge of the product 92 abutting the guide rails 32, 60. The marking pen is attached to the extensible armature 122 of an electric solenoid 124 which is mounted upon a bracket 126 supported by the framework 12. Thus, when the photo-multiplier tube responds to a light intensity indicating an objectionable defect in the forest product, an electrical signal is produced which actuates a relay mechanism 128 (FIG. 3), whereupon the marking solenoid 124 is activated to extend its armature and the attached marking pen toward the adjacent edge of the product. In this manner the product is provided with a visible mark at the location of the defect and of a length equal to the length of the defect.

In the embodiment illustrated in FIGS. 1–4, the visible markings on the edge of the forest product serve to control the operation of the cut-out saw. This is accomplished by positioning a photo-electric device 130 and a light source 132 therefor adjacent the saw and in position to scan the marked edge of the forest product. Thus, as a defect marking enters the field of the photo-electric device, the change in light intensity is detected by the latter which then activates an electric relay mechanism 134 (FIG. 4) to close the electric circuit of the solenoid 136 which controls the operation of the air valve 138 to retract the piston rod 108 of the air cylinder motor 110 and clamps the fingers 94 onto the forest product. Simultaneously the relay mechanism causes actuation of solenoid 140 for air valve 142 to extend the piston rod 80 of cylinder motor 82. The saw thus is extended into the path of travel of the forest product, cutting away that portion of the latter carrying the marking. A reversing limit switch (not shown) is actuated by the saw assembly at the limit of extension of the saw, to reverse the direction of drive of the air cylinder motor 82 and retract the saw. In the event the defect marking on the forest product is longer than the width of the saw kerf, the foregoing cut-out operation is repeated at the other end of the marking, whereby the entire defect and marking is removed.

Although marking of the forest product affords the advantage of permitting storage of the product preliminary to grading, it may be desirable in some instances to cut the defects concurrently with the detection. This may be accomplished as explained hereinbefore, by marking the product and then detecting the markings for activating the cut-out saw. Alternatively (FIG. 5), the step of marking the product may be eliminated by utilizing a conventional time delay relay mechanism 144 which functions after a predetermined time delay to complete the electric circuits of the air valve solenoids for the reciprocating air cylinder clamping and saw motors.

Figure 5:
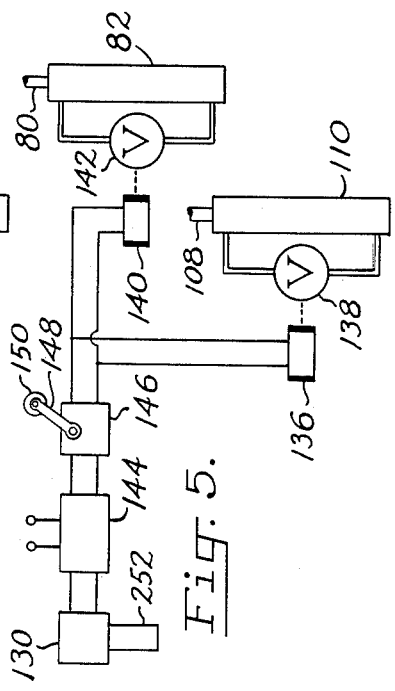
FIG. 5 is a schematic diagram in block form of an electric circuit for controlling the cut-out saw directly from the detecting component.

Since the abutting ends of adjacent pieces of lumber produce a defect signal similar to signals produced by such forest product defects as splits and checks, means is provided for deactivating the marking device or the cut-out saw when the abutting ends of adjacent pieces of product are presented to the photo-electric device 112. In the embodiments illustrated in FIGS. 3 and 5, such means is provided by a microswitch 146 mounted on the under side of the outfeed table 58 and having a switch actuator arm 148 carrying a roller 150 which projects through an opening 152 (FIG. 1) in the outfeed table immediately adjacent the forward end of the infeed table plate 14' for contact by the under side of the forest product. Since the outfeed table is positioned slightly below the level of the infeed table, the preceding piece of forest product 92 drops downward onto the outfeed table as its trailing end leaves the infeed table. The preceding piece of forest product thus contacts the microswitch roller and rotates the arm clockwise (FIG. 2) to open the microswitch contacts. These contacts are included in series in the electric control circuit of the marking pen solenoid 124 (FIG. 3) or in the electric circuit of the solenoids 136 and 140 which control the operation of the air cylinder motors for the clamping fingers and cut-out saw (FIG. 5).

The operation of the defect detector component of the apparatus now will be described, with particular reference to FIGS. 6 and 7.

An elongated transverse white strip 154 (FIG. 1) is provided on the outfeed table 58 directly below the photo-electric device 112, and the forest product to be scanned moves across this white background. The photo-multiplier tube produces electrical signals whose amplitude increases in the positive direction as the degree of discoloration of product defects increases. Accordingly, the largest signal is produced by black color, as when the moving slits are outside the field of the fixed slit, at the beginning and end of each scan, and the smallest signal is produced by white color, as when the white background projecting beyond the side edges of the product is scanned.

In between the white background signals an intermediate amplitude pulse occurs which is representative of the background color of the forest product. Superimposed upon the product background pulse are other pulses of varying amplitudes and widths which are representative of the various types and dimensions of product defects. For example, although the width of all defect pulses is directly proportional to the width of the defect scanned, the amplitude of defect pulses is dependent upon the degree of discoloration of the defect. Pulses produced by splits and checks generally have large amplitudes resulting from the shadows produced by illuminating the forest product at an angle.

With the fixed slit of the photo-electric device 112 oriented on the longitudinal center line of the white strip 154 and the rotating disc providing a moving spot which scans the length of the strip, a typical waveform pattern produced from the photo-multiplier tube as a forest product is moved across the white strip, is illustrated in FIG. 6–A as the output from the photo-electric device. Reading from left to right, the first high peak segment 160 represents the darkness between a preceding and next succeeding slit on the rotating disc, since no light is transmitted from the product surface to the photo-electric device. As the succeeding slit enters the field of the fixed slit, substantially normal thereto, the scanning spot first impinges upon the section of the white strip 154 extending beyond the edge of the forest product. This is represented by the low amplitude segment 162.

The next adjacent waveform segment 164 represents the background color of the forest product surface. As the spot scans further, the next waveform segment 166 of high amplitude represents a relatively narrow but dark defect, such as a split. The next waveform segment 164 again represents the background color of the product surface, and the higher amplitude waveform segment 168 adjacent thereto represents a slight defect such as a darkened grain which, as explained hereinafter, is considered to be non-objectionable. The next adjacent waveform segment 164 again represents the background color of the forest product surface. The next waveform segment 170 of high amplitude represents an objectionable defect such as a wide split or knot of dark color. The next adjacent waveform segment 164 again represents the background color of the product surface.

As the scanning spot leaves the opposite edge of the forest product it scans the remaining length of the underlying white strip 154 to produce the next adjacent low amplitude segment 162'. The slit on the rotating disc then passes beyond the field of the fixed slit to produce the high amplitude segment 160' which initiates the cycle described hereinbefore.

Since the segments 160, 160' of the waveform are produced when there is no light transmitted to the photo-multiplier tube and since similarly high amplitude segments are produced when a densely black defect is scanned, it is necessary that these segments, hereinafter called blanking segments, be removed, for otherwise they would falsely indicate the presence of a forest product defect and would effect marking and cutting of the forest product. Removal of the blanking segment is achieved in the embodiment illustrated by means of the gating circuit illustrated in FIG. 7. This circuit includes a pair of magnetic proximity pickups 172, 172, one positioned to produce a pulse when each of the moving slits enters the field of the fixed slit and the other positioned to produce a pulse when each of the moving slits leaves the field of the fixed slit. These pulses are amplified by the transistorized amplifiers 174, 174 and then employed to trigger the transistorized multivibrator 176.

The multivibrator output is fed to the emitter follower 178, causing the latter to alternate between cut-off and conduction. The output from the emitter follower is connected through a gating circuit including the diode 180, to the output terminal 182 of a cathode follower leading from the output from the photo-multiplier tube. Thus the output from the emitter follower shunts the output signal from the photo-multiplier tube. The proximity pickups synchronize the multivibrator so that the emitter follower is in saturation when each moving slit is removed from the field of the fixed slit and is cut off when each moving slit is in the field of the fixed slit. Thus, the shunting diode 180 conducts during the period of the blanking segment and thus short circuits the latter (FIG. 6-B), and the shunting diode is cut off during the scanning period to permit the output signal from the photo-multiplier tube to pass through the capacitor 184 to the amplitude discriminator 186 (FIG. 6).

The amplitude discriminator functions to distinguish between degrees of discoloration, thus affording means for classifying defects as objectionable and non-objectionable (FIG. 6-C). In the embodiment illustrated, the amplitude discriminator includes a diode 188 (FIG. 7) and the biasing potentiometer 190 which functions to vary the amplitude requirements for conduction of the diode.

Background compensating means 192 (FIG. 6) also is provided for compensating for variations in background color of the forest product surface in order to stabilize the positive peak voltage output from the photo-multiplier tube. The positive peak values of the output signal are dependent upon the total area between the ends of the signal. Since the peak to peak amplitude of this output signal remains fixed between the levels representing the black and white colors, and since this signal is capacitance coupled to a cathode follower, the positive peak voltage of the signal varies inversely with the degree of discoloration of the forest product surface background.

In the embodiment illustrated, compensation for variations in background discoloration is achieved by passing the output signal from the photo-multiplier tube, at terminal 182, (FIG. 7), through the rectifier 194 and filter network 196 and background control potentiometer 198 to the input of the discriminator diode 188. This D.-C. level, which is proportional to the positive peak amplitude of the output signal of the photo-multiplier tube, is superimposed upon the D.-C. component from the restoring circuit 200. Accordingly, when the forest product surface background color becomes darker and the output signal level increases, a negative voltage is impressed on the D.-C. restorer simultaneously to return the background signal level toward its original value.

A sensitivity potentiometer 202 is provided in the restorer circuit for distinguishing between such defects as a narrow dark forest product and a wide defect on an even wider forest product. This potentiometer functions to vary the percentage of correction signal applied to the D.-C. restorer. The percentage of correction signal required increases as the width of the forest product decreases.

Integrating means 204 (FIG. 6) also is provided for defining the width required to classify a forest product defect as objectionable. In the embodiment illustrated, the signal output from the amplitude discriminator 186 (FIG. 6) is first amplified at 206 (FIG. 7) and then clipped at 208 to provide a constant amplitude negative signal output. This signal is then impressed upon the grid of the clamped tube 210 to cut off the latter. The plate resistor 212 of this tube is shunted by the capacitor 214 which discharges through the resistor when the tube is cut off. This produces an output pulse 216 (FIG. 6-D) the amplitude of which is determined by the width of the input pulse. When the pulses cease, the shunt capacitor recharges rapidly through the tube.

The integrated pulses then are impressed upon the grid of tube 218 (FIG. 7), which is normally cut off. The degree to which the tube is cut off determines whether or not the incoming signal has sufficient amplitude to cause conduction. The potentiometer 220 provides the control by which to vary the amplitude required for conduction, and hence provides a second amplitude discriminating means 222 (FIG. 6) by which to vary the classification of the width of defects.

Figure 7:
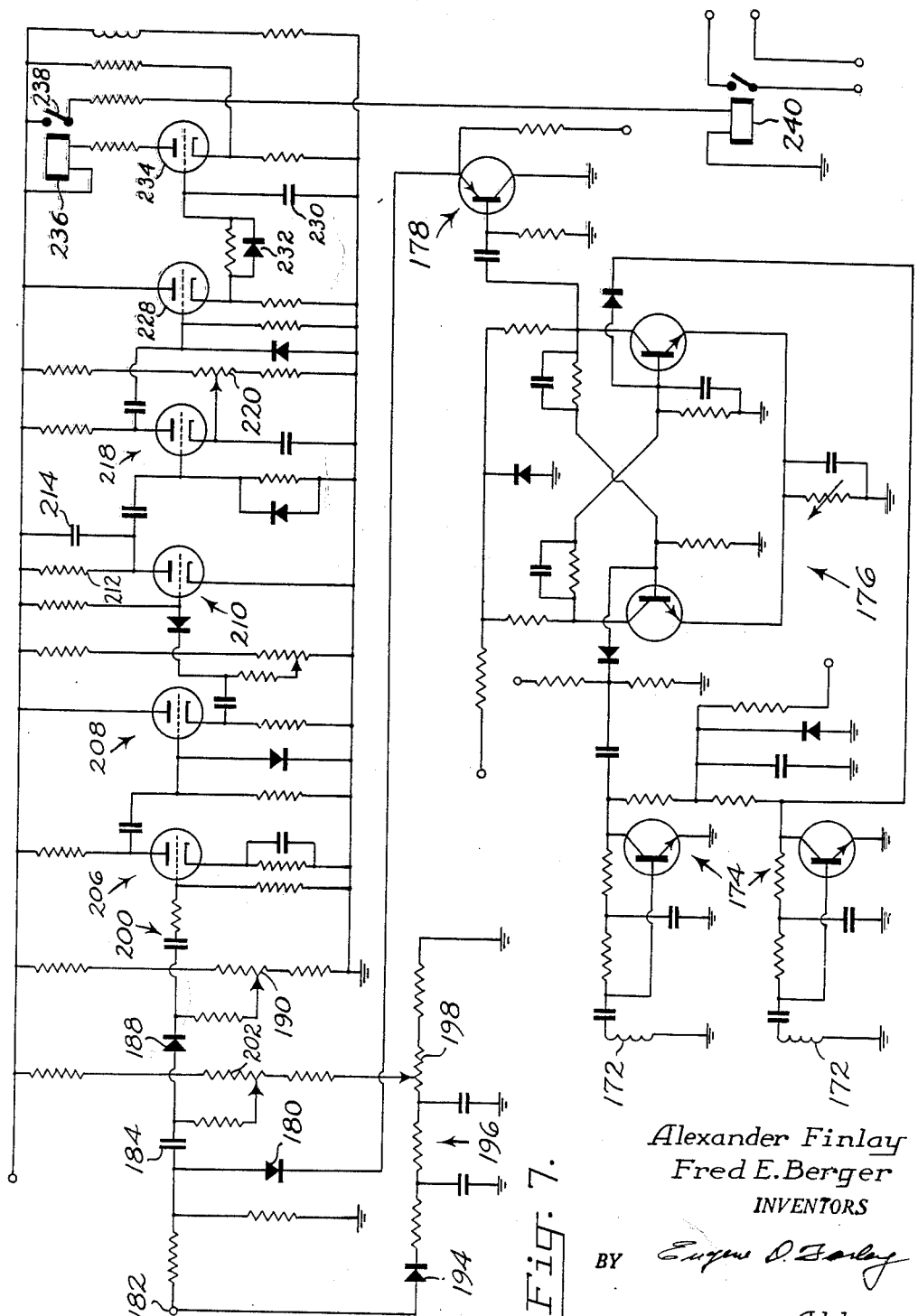
FIG. 7 is a schematic diagram of a complete electric circuit for the block diagram of FIG. 6.

When the tube 218 conducts, the inverted output pulse 224 (FIG. 6-E) produced thereby is passed to pulse stretching means 226 (FIG. 6) wherein it is impressed upon the grid of the cathode follower tube 228 (FIG. 7). This grid is clamped so that only the positive portion of the signal from the preceding stage passes, charging the capacitor 230 rapidly through the diode 232. The tube 234 amplifies the signal and energizes the relay 236. Actuation of this relay closes the associated contacts 238 and completes the electric circuit of the relay 240 which controls the operation of the marking pen solenoid 124 (FIG. 6).

After the input signal passes, the capacitor 230 (FIG. 7) must discharge slowly through the resistor shunting the diode 232, thus producing a stretched pulse 242 (FIG. 6-F) which delays the activation of the relay 236 (FIG. 7) until after the scan has been completed. Since the relay 236 remains closed for a period longer than the length of a complete scan, a mark is produced for as long as a defect persists.

As illustrated in FIG. 6, means may be provided for varying the length required for a defect to be considered objectionable. In the embodiment illustrated, such means may be provided by a conventional pulse counter 244 which receives the pulses and provides one output pulse 246 to the marking pen solenoid 124 (FIG. 6) for a predetermined but variable number of input pulses. For example, in the embodiment illustrated (FIG. 6-F) one output pulse is provided for a minimum of three consecutive input pulses, the latter number corresponding to the minimum length of a defect considered to be objectionable.

Figure 8:
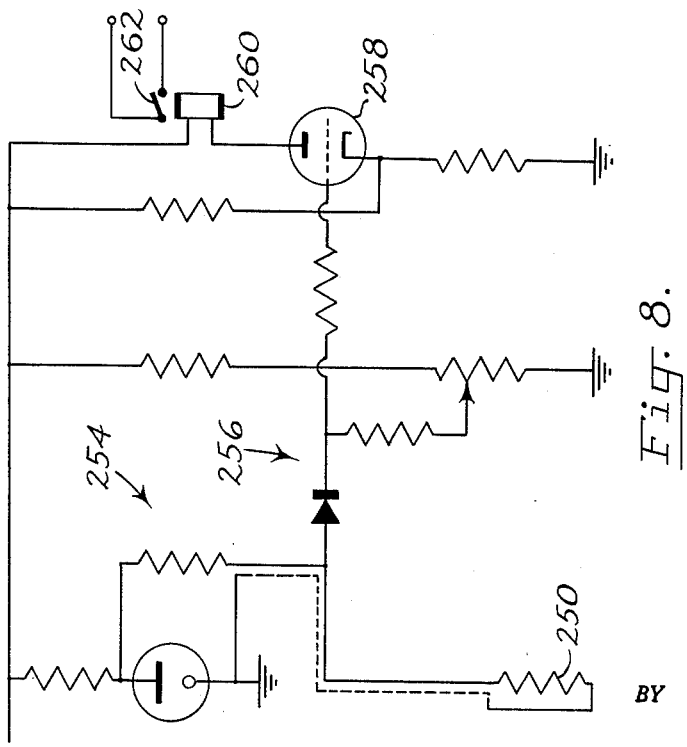
FIG. 8 (Sheet 2) is a schematic diagram of an electric circuit for the mark detecting and cut-out saw components of the apparatus.

Means for detecting the presence of the ink marking on the edge of the forest product may be provided by such means as the photo-electric device described hereinbefore, with the output signal of the photo-multiplier tube functioning to active a relay in the electric circuit of the air valve solenoids for the clamping motor and saw reciprocating motor. In the alternative embodiment illustrated in FIG. 8, a cadmium sulfide crystal 250 is mounted in a collimating barrel 252 (FIGS. 4 and 4) which is directed toward the edge of the lumber where the ink marking is applied. This crystal is included in a voltage divider circuit 254, and since it changes resistance in proportion to the illumination impressed upon it, the voltage change across it is impressed upon a biased diode network 256 which is adjusted to pass only those signals produced when the crystal is in the field of marking. The signal thus passed is impressed upon a normally cut off tube 258, causing conduction of the latter and consequent actuation of the relay 260. Thereupon the relay contacts 262 close to complete the electric circuits of the air valve solenoids of the forest product clamping motor and the cut-out saw motor.

The method and apparatus described hereinbefore affords simplified and versatile means for identifying and evaluating surface characteristics of forest products automatically and at a rate of speed which permits such operation to be included in the conventional product manufacturing line without effecting the normal rate of production. The simplicity and ruggedness of the apparatus afford economical manufacture and installation and a minimum of time and technical experience for maintenance and operation. The waveform patterns resulting from detection of various types of surface characterstics not only function to control the operation of marking, cut-out and other processing components of the apparatus, but they also may be utilized for direct analysis by viewing or photographing from the cathode ray tube of an oscilloscope. A wide range of adjustment is provided in the apparatus to permit a corresponding range of variation in evaluating the dimensions, coloring and other characteristics of a wide range of defects.

It will be apparent to those skilled in the art that various changes may be made in the details of construction described hereinbefore without departing from the spirit of this invention and the scope of the appended claims.

We claim:

1. Apparatus for processing forest products according to surface characteristics, comprising means for illuminating the forest products, means for scanning successively increments which constitute substantially the entire surface area of the illuminated products for reflected variations in light intensity corresponding to variations in random discoloration and geometry of the surface characteristics of the forest products, means for converting the variations in light intensity to variations in electrical potential corresponding to the degree of discoloration and geometry of characteristics, means for selecting predetermined ones of said variations in electrical potential corresponding to objectionable disclororation and geometry characteristics, and means responsive to said selected variations to effect processing of the forest products at the location of the objectionable characteristics.

2. The apparatus of claim 1 wherein the means for selecting certain of said variations in electrical potential comprises the combination of a diode interconnecting the output of the converting means and the input of the responsive means and operable upon conduction of activate the responsive means, and a potentiometer connecting the diode to a source of electrical potential for varying the amplitude requirements of said variations in electrical potential for conduction of the diode.

3. The apparatus of claim 1 wherein the responsive means comprises an electrically actuated relay having switch contacts in the electric circuit of electrical processing means.

4. The apparatus of claim 1 wherein the responsive means comprises an electrically actuated relay having switch contacts in the electric circuit of an electrically actuated marking device, and including means for detecting the presence of markings applied to the forest products by the marking device, and means responsive to said detecting means for actuating a cut-out saw to remove the portions of the forest products at the locations of said markings.

5. The apparatus of claim 4 wherein the detecting means comprises a light-sensitive variable resistance arranged in a voltage divider circuit, the voltage divider circuit being connected to an electron discharge device to control conduction of the latter, and the means responsive to said detecting means comprises an electrically actuated relay operable upon conduction of said electron discharge device to actuate an electrically actuated cut-out saw.

6. The apparatus of claim 1 wherein the responsive means comprises an electrically actuated relay having switch contacts in the electric circuit of an electrically actuated cut-out saw.

7. Apparatus for processing forest products according to surface characteristics, comprising means for illuminating the forest products, means for scanning successively increments which constitute substantially the entire surface area of the illuminated products for reflected variations in light intensity corresponding to variations in random discoloration and geometry of the surface characteristics of the forest products, means for converting the variations in light intensity to amplitude and width variations in electrical potential corresponding to the degree and width of discoloration of characteristics, means for selecting predetermined ones of said variations in electrical potential corresponding to objectionable discoloration characteristics, means for converting said selected variations in electrical potential to amplitude variations proportional to the width of said selected variations, means for selecting certain of said amplitude variations corresponding to objectionable widths of discoloration characteristics, and means responsive to said selected amplitude variations to effect processing of the forest products at the locations of the objectionable characteristics.

8. The apparatus of claim 7 wherein the means for converting said selected variations in electrical potential to amplitude variations comprises electrical potential integrating means arranged to receive said selected variations and responsive thereto to produce output signals the amplitudes of which are proportional to the widths of the said selected variations.

9. The apparatus of claim 7 wherein the means for selecting certain of said amplitude variations comprises an electron discharge device having a control grid connected to said converting means and arranged to receive said amplitude variations, and a potentiometer connecting said electron discharge device to a source of electrical potential for varying the amplitude requirements of said amplitude variations for conduction of the electron discharge device, the output of the electron discharge device being connected to the responsive means for actuating the latter upon conduction of the electron discharge device.

10. The apparatus of claim 7 including means for converting to an electrical actuating potential a predetermined number of said selected amplitude variations corresponding to the objectionable length of a discoloration characteristic, the responsive means being responsive to said actuating potential.

11. The apparatus of claim 1 including means for conveying a plurality of forest products past the scanning means, means mounting the scanning means for scanning a transverse area of the forest products, means in the area of the scanning means for offsetting the margins of the trailing end of the leading forest product with respect to the margins of the adjacent leading end of the next trailing forest product, and control means for the responsive means and positioned for operation by the offset leading forest product to inactivate the responsive means and prevent processing of the adjacent ends of forest products.

References Cited in the file of this patent

UNITED STATES PATENTS

| | | |
|---|---|---|
| 1,946,457 | Donnelly et al. | Feb. 6, 1934 |
| 2,617,483 | Porter | Nov. 11, 1952 |
| 2,623,587 | Hervey | Dec. 30, 1952 |
| 2,652,864 | De Anguerra | Sept. 22, 1953 |
| 2,871,940 | Meunier | Feb. 3, 1959 |
| 2,877,846 | Tobey | Mar. 17, 1959 |
| 2,966,086 | Sjostrom | Dec. 27, 1960 |

FOREIGN PATENTS

| | | |
|---|---|---|
| 321,211 | Switzerland | June 15, 1957 |